US012718969B2

(12) United States Patent
Yasuno et al.

(10) Patent No.: US 12,718,969 B2
(45) Date of Patent: Aug. 25, 2026

(54) WIRE CONDUCTOR, INSULATED WIRE, AND WIRE HARNESS

(71) Applicant: SUMITOMO WIRING SYSTEMS, LTD., Mie (JP)

(72) Inventors: Shingo Yasuno, Mie (JP); Hayato Ooi, Mie (JP); Akira Kitabata, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 188 days.

(21) Appl. No.: 18/290,198

(22) PCT Filed: May 13, 2022

(86) PCT No.: PCT/JP2022/020146

§ 371 (c)(1),
(2) Date: Nov. 10, 2023

(87) PCT Pub. No.: WO2022/239853

PCT Pub. Date: Nov. 17, 2022

(65) Prior Publication Data

US 2024/0274315 A1 Aug. 15, 2024

(30) Foreign Application Priority Data

May 14, 2021 (JP) ................................ 2021-082668

(51) Int. Cl.
*H01B 7/00* (2006.01)
*H01B 1/02* (2006.01)

(52) U.S. Cl.
CPC .......... *H01B 7/0009* (2013.01); *H01B 1/023* (2013.01); *H01B 7/0045* (2013.01)

(58) Field of Classification Search
CPC ..... H01B 7/0009; H01B 1/023; H01B 7/0045
See application file for complete search history.

(56) References Cited

U.S. PATENT DOCUMENTS

2018/0096750 A1 4/2018 Masui
2019/0292632 A1 9/2019 Kusakari et al.

FOREIGN PATENT DOCUMENTS

JP 2003-303515 A 10/2003
JP 2005-259583 A 9/2005
(Continued)

OTHER PUBLICATIONS

WO 2018163465 A1; published in Sep. 13, 2018; English translation (Year: 2018).*
(Continued)

*Primary Examiner* — Pete T Lee
(74) *Attorney, Agent, or Firm* — Venjuris, P.C.

(57) ABSTRACT

A wire conductor is made of aluminum or an aluminum alloy, and is not likely to, when it is ultrasonically welded to a connection terminal, cause a welding defect in a welded portion. A wire conductor includes: a lower strand layer in which a plurality of strands formed by twisting together a plurality of bare wires 1*a* made of aluminum or an aluminum alloy are bundled and twisted together; and an upper strand layer formed by twisting a plurality of strands around an outer circumference of the lower strand layer, wherein in a cross section of the wire conductor that is orthogonal to its axial direction, a proportion of an area occupied by gaps formed between the lower strand layer and the upper strand layer to an area of gaps that are not occupied by the bare wires is 63% or less.

7 Claims, 5 Drawing Sheets

(56) References Cited

FOREIGN PATENT DOCUMENTS

| | | | |
|---|---|---|---|
| JP | 2019-186108 | A | 10/2019 |
| JP | 2019-200997 | A | 11/2019 |
| JP | 2020-087523 | A | 6/2020 |
| JP | 201900997 | A1 * | 1/2021 |
| WO | WO 2014112174 | A1 * | 7/2014 |

OTHER PUBLICATIONS

Ji et al. (WO 2018163465 A1; published in Sep. 13, 2018; English translation) (Year: 2018).*

International Search Report issued on Aug. 2, 2022 for WO 2022/239853 A1 (4 pages).

* cited by examiner

WIRE CONDUCTOR, INSULATED WIRE, AND WIRE HARNESS

CROSS REFERENCE TO RELATED APPLICATIONS

This application is a national phase of PCT application No. PCT/JP2022/020146, filed on 13 May 2022, which claims priority from Japanese patent application No. 2021-082668, filed on 14 May 2021, all of which are incorporated herein by reference.

TECHNICAL FIELD

The present disclosure relates to a wire conductor, an insulated wire, and a wire harness.

BACKGROUND

As disclosed in Patent Documents 1 and 2, wires including a conductor (aluminum conductor) made of aluminum or an aluminum alloy are increasingly used as wires to be routed in a vehicle. Lightweight and high-current wires are being developed as wires for use in vehicles, and aluminum conductors can be used to reduce the weight of wires, compared to the case where conductors made of copper or a copper alloy are used. Also, when large diameter conductors are used to handle high currents, using aluminum conductors can suppress an increase in mass of the wires.

In Patent Document 2, a coated wire having an aluminum-containing conductor is crimped and connected to a connection terminal, but it is also often the case that an aluminum conductor is ultrasonically welded to a connection terminal. For example, Patent Document 3 discloses a configuration in which a male terminal and a twisted wire conductor are connected to each other by ultrasonic welding. According to the disclosure of Patent Document 3, the connection is made during ultrasonic welding with bare wires (strands) of the twisted wire conductor twisted as a whole so that they do not dissociate.

PRIOR ART DOCUMENT

Patent Documents

Patent Document 1: WO 2018/079048
Patent Document 2: JP 2020-087523 A
Patent Document 3: JP 2019-200997 A

SUMMARY OF THE INVENTION

Problems to be Solved

When an aluminum conductor is ultrasonically welded to a connection terminal, there may be cases where bare wires constituting the conductor are deflected in the welded portion as indicated by the arrow A2 in FIG. 5. Such a deflection causes poor outer appearance and indicates a low fixation strength of the conductor to the connection terminal, and thus it is regarded as a welding defect. It is preferable that an occurrence of such a structure regarded as a welding defect be suppressed as much as possible.

Accordingly, it is an object to provide a wire conductor that is made of aluminum or an aluminum alloy, and is not likely to, when it is ultrasonically welded to a connection terminal, cause a welding defect in the welded portion, and to provide an insulated wire and a wire harness that are provided with such a wire conductor.

Means to Solve the Problem

According to the present disclosure, a wire conductor includes: a lower strand layer in which a plurality of strands formed by twisting together a plurality of bare wires made of aluminum or an aluminum alloy are bundled and twisted together; and an upper strand layer formed by twisting a plurality of strands around an outer circumference of the lower strand layer, wherein in a cross section of the wire conductor that is orthogonal to its axial direction, a proportion of an area occupied by gaps formed between the lower strand layer and the upper strand layer to an area of gaps that are not occupied by the bare wires is 63% or less.

According to the present disclosure, an insulated wire includes: the above-described wire conductor; and an insulating coating that coats an outer circumference of the wire conductor.

According to the present disclosure, a wire harness includes: the above-described insulated wire; and a connection terminal, wherein, at a terminal of the insulated wire, the wire conductor exposed from the insulation coating is ultrasonically welded to the connection terminal.

Effect of the Invention

The wire conductor according to the present disclosure is a wire conductor that is made of aluminum or an aluminum alloy, and is not likely to, when it is ultrasonically welded to a connection terminal, cause a welding defect in the welded portion. Also, the insulated wire and the wire harness according to the present disclosure are provided with the above-described wire conductor.

DETAILED DESCRIPTION TO EXECUTE THE INVENTION

Description of Embodiments of Present Disclosure

Figure 1:
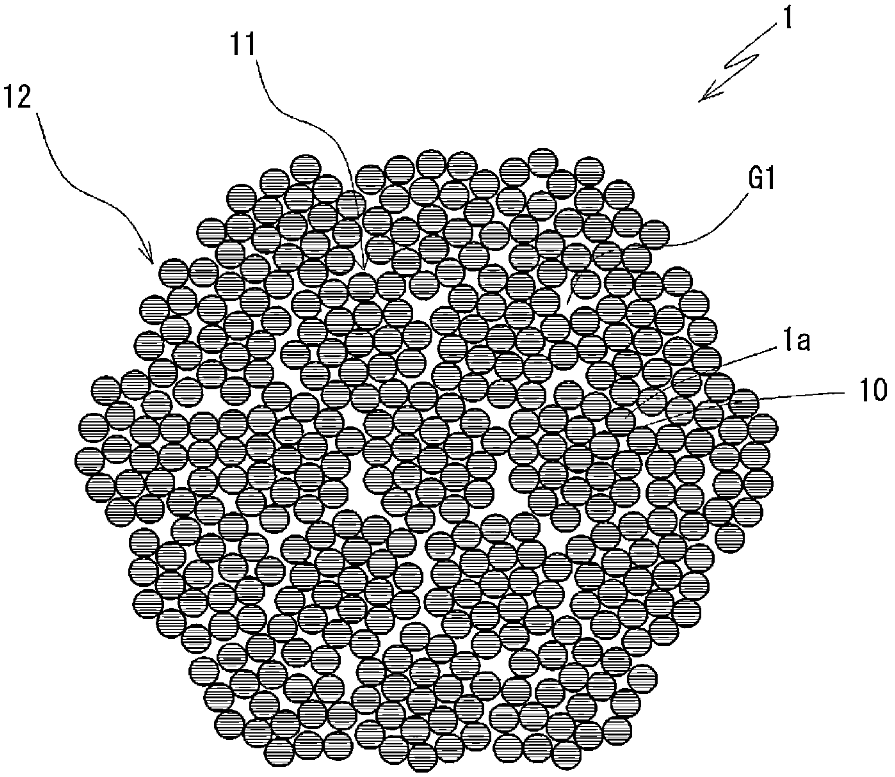
FIG. 1 is a cross-sectional view schematically illustrating a wire conductor with a small inter-layer gap proportion according to an embodiment of the present disclosure.

First, embodiments of the present disclosure will be listed and described.

(1) According to the present disclosure, a wire conductor includes: a lower strand layer in which a plurality of strands formed by twisting together a plurality of bare wires made of aluminum or an aluminum alloy are bundled and twisted together; and an upper strand layer formed by twisting a plurality of strands around an outer circumference of the lower strand layer, wherein in a cross section of the wire conductor that is orthogonal to its axial direction, a proportion of an area occupied by gaps formed between the lower strand layer and the upper strand layer to an area of gaps that are not occupied by the bare wires is 63% or less.

The above-described wire conductor has a structure in which the proportion of gaps formed between the lower strand layer and the upper strand layer to the gaps that are not occupied by the bare wires is suppressed to 63% or less, and the gaps are not concentrated between the lower strand layer and the upper strand layer. Accordingly, when performing ultrasonic welding, the bare wires constituting the strands are likely to dissociate. When ultrasonic welding is performed in a state in which the dissociated bare wires are put together closely, the welded portion is not likely to undergo a deflection. Also, a large fixation force can be obtained at the welded portion. With this, welding defects are not likely to occur between the wire conductor and a connection terminal.

(2) Here, in Embodiment (1), preferably, the upper strand layer has a twist pitch that is greater than a twist pitch of the lower strand layer. This makes it easy to suppress the sizes of gaps between the lower strand layer and the upper strand layer to be small. As a result, an occurrence of a welding defect at the time of ultrasonic welding can be easily suppressed.

(3) In Embodiment (1) or (2), preferably, in the cross section, the proportion of an area occupied by gaps formed between the lower strand layer and the upper strand layer is at least 15% and at most 25%. With this, the wire conductor as a whole has an appropriate range of gaps, and thus the bare wires are likely to dissociate and welding defects are not likely to occur at the time of ultrasonic welding.

(4) In any one of Embodiments (1) to (3), preferably, a twist pitch of the bare wires of the strands is at least 90 times as large as an outer diameter of the bare wires. If the twist pitch of the bare wires constituting the strands is large, the bare wires are likely to dissociate and welding defects are not likely to occur, at the time of ultrasonic welding.

(5) In any one of Embodiments (1) to (4), preferably, a twist pitch of the strands of the lower strand layer is at least 200 times as large as an outer diameter of the bare wires, and a twist pitch of the strands of the upper strand layer is at least 250 times as large as the outer diameter of the bare wires. If the twist pitches of the lower strand layer and the upper strand layer are large, the sizes of gaps between the lower strand layer and the upper strand layer can be easily suppressed to be small. Also, the bare wires constituting the strands are likely to dissociate. With these effects, an occurrence of a welding defect at the time of ultrasonic welding can be easily suppressed.

(6) In any one of Embodiments (1) to (5), preferably, a cross-sectional area of the entire wire conductor is at least 16 $mm^2$ and at most 50 $mm^2$. If the wire conductor has a conductor cross-sectional area in this range, suppressing the proportion of gaps between the lower strand layer and the upper strand layer to the entire gap area to be low will realize a large effect of suppressing a welding defect at the time of ultrasonic welding.

(7) According to the present disclosure, an insulated wire includes: the wire conductor according to any one of Embodiments (1) to (5); and an insulating coating that coats an outer circumference of the wire conductor. Since the insulated wire includes the wire conductor in which the proportion of gaps between the lower strand layer and the upper strand layer to the entire gap area is suppressed to a predetermined range, when the wire conductor is exposed at a terminal thereof and is ultrasonically welded to a connection terminal, it is possible to suppress a welding defect due to an occurrence of a deflection of bare wires or a reduction in fixation force.

(8) According to the present disclosure, a wire harness includes: the insulated wire according to Embodiment (7); and a connection terminal, wherein at a terminal of the insulated wire, the wire conductor exposed from the insulation coating is ultrasonically welded to the connection terminal. The wire harness includes the wire conductor in which the proportion of gaps between the lower strand layer and the upper strand layer to the entire gap area is suppressed to the predetermined range, and the wire conductor is exposed at the terminal of the insulated wire and is ultrasonically welded to the connection terminal. Therefore, the welded portion is not likely to undergo a welding defect due to an occurrence of a deflection of bare wires or a reduction in fixation force between the wire conductor and the connection terminal. Accordingly, the wire harness has a favorable welding structure between the insulated wire and the connection terminal.

DETAIL OF EMBODIMENTS OF PRESENT DISCLOSURE

The following will describe a wire conductor, an insulated wire, and a wire harness in detail, according to an embodiment of the present disclosure with reference to the drawings.

(Structure of Wire Conductor)

FIG. 1 illustrates a structure of a wire conductor 1 according to an embodiment of the present disclosure in a schematic cross-sectional view. The wire conductor 1 includes a plurality of bare wires 1*a* made of aluminum or an aluminum alloy. The plurality of bare wires 1*a* are twisted together into strands 10. The diameter of the bare wires 1*a* is not particularly limited, but may be in a range of 0.1 mm to 0.7 mm by way of example. The number of bare wires 1*a* constituting a single strand 10 is also not particularly limited, but may be in a range of 7 to 80 by way of example.

A lower strand layer 11 is configured as a structure obtained by twisting a plurality of strands 10 into a bundle. The number of strands 10 constituting the lower strand layer is not particularly limited, but is preferably 7. Furthermore, an upper strand layer 12 is formed around the outer circumference of the lower strand layer 11. The upper strand layer 12 is configured as a layer obtained by twisting a plurality of strands 10 around the outer circumference of the lower strand layer 11 coaxially with the lower strand layer 11. Also, the number of strands 10 constituting the upper strand layer 12 is not particularly limited, but is preferably 12.

In a cross-section of the wire conductor 1 according to the present embodiment that is orthogonal to its axial direction thereof (hereinafter, also referred to simply as "cross section"), the proportion (inter-layer gap proportion) of the area occupied by inter-layer gaps G1, that is, gaps G1 formed between the lower strand layer 11 and the upper strand layer

Figure 2:
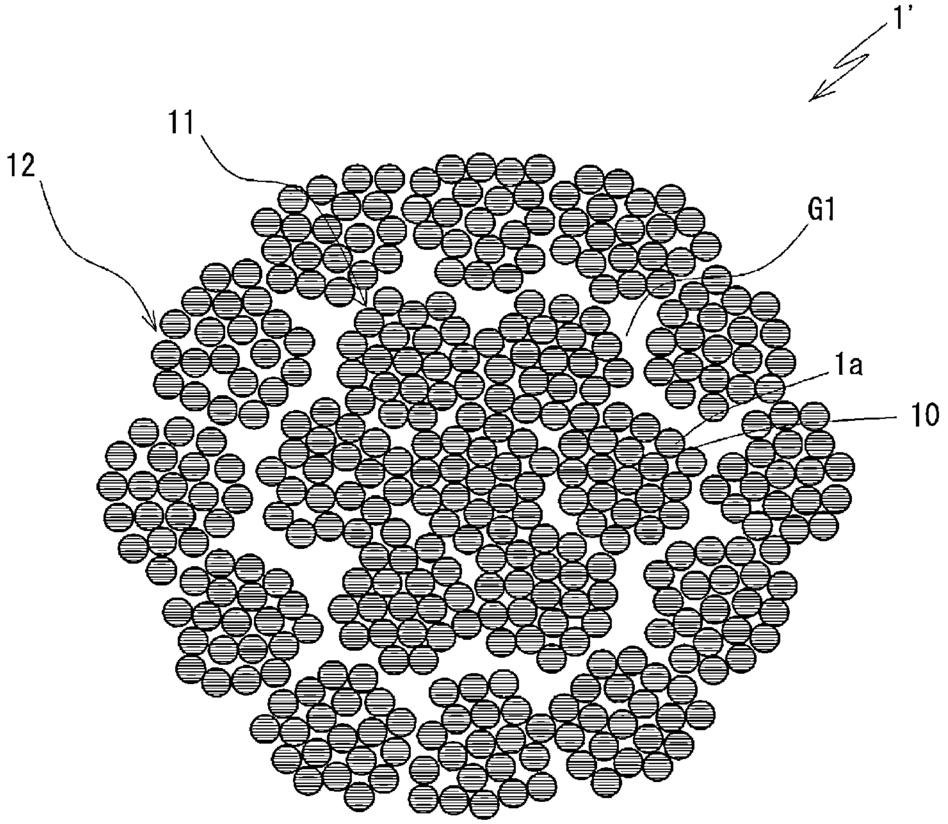
FIG. 2 is a cross-sectional view schematically illustrating a wire conductor with a large inter-layer gap proportion.

12, to the area of gaps that are not occupied by any bare wire 1*a* is suppressed to be low. As shown in FIG. 2, in a wire conductor 1' in which the upper strand layer 12 is formed around the outer circumference of the lower strand layer 11, larger inter-layer gaps G1 may be formed between the lower strand layer 11 and the upper strand layer 12. In this case, the inter-layer gap proportion (proportion of gaps between the layers) is high. However, in the wire conductor 1 according to the present embodiment, as shown in FIG. 1, the area of the inter-layer gaps G1 between the lower strand layer 11 and the upper strand layer 12 is not significantly larger than the area of gaps between the strands 10 inside the lower strand layer 11 and the area of gaps between the strands 10 inside the upper strand layer 12, and thus the inter-layer gap proportion is low.

Figure 3:
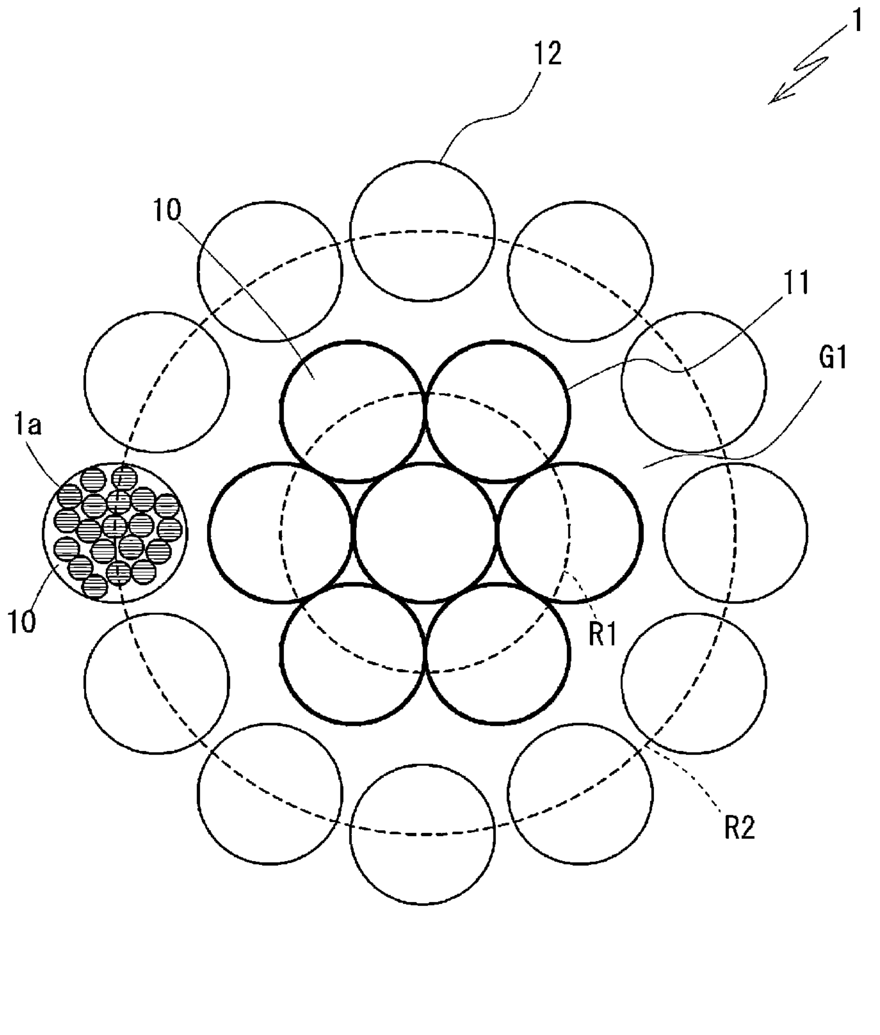
FIG. 3 is a diagram illustrating a cross-section of a wire conductor in a simplified manner such that illustration of bare wires constituting strands is omitted except for one strand.

In the wire conductor 1 according to the present embodiment, a specific range of the inter-layer gap proportion may preferably be not greater than 63% by way of example. More preferably, the inter-layer gap proportion may be not greater than 62%. An example of a method for quantitatively evaluating the inter-layer gap proportion is such that, using a photo of a cross-section, as described with reference to FIG. 3, the area of gaps present inside a circle (with a lower strand layer core diameter R1) passing through the centers of the strands 10 facing outward (i.e. on the outer side) in the lower strand layer 11 is subtracted from the area of gaps inside a circle (with an upper strand layer core diameter R2) passing through the centers of the strands 10 constituting the upper strand layer 12, and the obtained difference is regarded as an area (a) of the inter-layer gaps G1. Also, the area of gaps in the entire wire conductor 1 (the area of gaps present inside the outer boundary of the entire wire conductor 1) is estimated as an entire gap area (A). Then, the proportion of the area of the inter-layer gaps G1 to the entire gap area can be obtained as an inter-layer gap proportion (a/A×100%).

As will be described in detail later, if the wire conductor 1 has a low inter-layer gap proportion, when the wire conductor 1 is ultrasonically welded to a surface of a connection terminal 30 or the like, the bare wires 1*a* are likely to dissociate (disperse), suppressing a welding defect from occurring. There is no particular lower limit for the inter-layer gap proportion, but the inter-layer gap proportion of the actual wire conductor 1 of a two-layer structure including a lower strand layer and an upper strand layer is at least about 50%.

The inter-layer gap G1 may encompass an inter-layer gap G1 that is annular and is continuous over the entire outer circumference of the lower strand layer 11, or inter-layer gaps G1 including a plurality of gaps divided at positions at which a strand 10 of the lower strand layer 11 and a strand 10 of the upper strand layer 12 are in contact with each other. However, such inter-layer gaps G1 including a plurality of divided gaps are preferable in view of suppressing an occurrence of a welding defect. In this case, it is more preferable that the area of a single continuous inter-layer gap G1 in a cross section is, for example, not greater than three times as large as the cross-sectional area of the bare wire 1*a*. Furthermore, it is preferable that there is no continuous gap between the lower strand layer 11 and the upper strand layer 12. The phrase "there is no continuous gap" means that in a cross section of the wire conductor 1, there is no gap of a dimension such that, e.g., three bundles of bare wires (1*a*) included in the upper strand layer 12 are accommodated in the gap directly, i.e., without deformation. This may mean that there is no gap of a dimension such that more preferably two bundles or most preferably one bundle of bare wires (1*a*) are accommodated in the gap directly i.e. without deformation.

The area (dimension) itself of the inter-layer gaps G1 is not particularly limited as long as the inter-layer gap proportion in a cross section of the wire conductor 1 is sufficiently low. However, if the area of the inter-layer gaps G1 is kept small, the bare wires 1*a* dissociate more easily, resulting in the highly advantageous effect of suppressing welding defects. Therefore, a gap ratio of the entire wire conductor 1 is suppressed to preferably 25% or less, and more preferably 20% or less, for example. As a result of the gap ratio of the entire wire conductor 1 being suppressed so as not to be too high, the area of the inter-layer gaps G1, which is obtained based on the product of the inter-layer gap proportion and the gap ratio, with respect to the area of the entire wire conductor 1 is suppressed to be low. On the other hand, if the gaps between the bare wires 1*a* inside the strands 10 are too small, it will be difficult to dissociate the bare wires 1*a* efficiently, and thus the gap ratio of the entire wire conductor 1 is preferably at least 15%. The gap ratio of the entire wire conductor 1 can be estimated as a proportion of the entire gap area (A) to the area of the entire wire conductor 1 (total area AO of the region inside the outer boundary of the entire wire conductor 1) (A/A0×100%).

The twist pitch (strand twist pitch) of the bare wires 1*a* of each strand 10, the twist pitch (lower twist pitch) of the strands 10 of the lower strand layer 11, and the twist pitch (upper twist pitch) of the strands 10 of the upper strand layer 12 are not particularly limited. However, it is preferable that the upper twist pitch be greater than the lower twist pitch in view of reducing the inter-layer gap proportion. For example, the upper twist pitch is preferably at least 1.1 times as large as the lower twist pitch, and is more preferably at least 1.2 times as large as the lower twist pitch. This ratio is not particularly limited, but the upper twist pitch is preferably suppressed to at most 2 times as large as the lower twist pitch, in view of suppressing an occurrence of disorderly twisting or a reduction in bendability.

Furthermore, the bare wires 1*a* can be more easily dissociated during ultrasonic welding the larger the strand twist pitch, the lower twist pitch, and the upper twist pitch are, at least to some extent, and thus the effect of suppressing welding defects is enhanced. Particularly, by increasing the strand twist pitch, it is possible to achieve a greater effect. As a preferable example of a specific twist pitch, the strand twist pitch is preferably at least 90 times, more preferably at least 150 times, and most preferably at least 200 times as large as the outer diameter of the bare wires 1*a*. Alternatively, the strand twist pitch is preferably at least 30 mm, more preferably at least 50 mm, and most preferably at least 65 mm. Although there is no upper limit for the strand twist pitch, the strand twist pitch is preferably at most 250 times as large as the outer diameter of the bare wires 1*a*, or is at most 75 mm, for example.

The lower twist pitch is preferably at least 200 times, and more preferably at least 250 times as large as the outer diameter of the bare wires 1*a*. Alternatively, the lower twist pitch is preferably at least 68 mm, and more preferably at least 80 mm. Although there is no upper limit for the lower twist pitch, the lower twist pitch is preferably at most 300 times as large as the outer diameter of the bare wires 1*a*, or is at most 93 mm, for example. The upper twist pitch is preferably at least 250 times, and more preferably at least 300 times as large as the outer diameter of the bare wires 1*a*. Alternatively, the upper twist pitch is preferably at least 85 mm, and more preferably at least 100 mm. Although there is no upper limit for the upper twist pitch, the upper twist pitch is preferably at most 400 times as large as the outer diameter of the bare wires 1*a*, or is at most 130 mm, for example. The dimensions of the twist pitches are parameters that affect the inter-layer gap proportion, but other parameters that affect the inter-layer gap proportion may include, for example, the strength of tensile force or the like to be applied to the bare wires 1*a* or the strands 10, when a plurality of bare wires 1*a* are twisted into a strand 10 or when a plurality of strands 10 are twisted into the lower strand layer 11 or the upper strand layer 12.

In the wire conductor 1 according to the present embodiment, the conductor cross-sectional area as a whole is not particularly limited. However, if the conductor cross-sectional area is too small, welding defects are relatively less likely to occur regardless of the specific configuration of the wire conductor 1, and thus the conductor cross-sectional area is preferably large to some extent in view of enhancing the effect of suppressing a welding defect due to a reduction in the inter-layer gap proportion. For example, the conductor cross-sectional area is preferably at least 16 $mm^2$. On the other hand, even if the conductor cross-sectional area is too large, there may be cases where it is difficult to suppress a welding defect, and thus the conductor cross-sectional area is preferably at most 50 $mm^2$, for example.

When the wire conductor 1 is manufactured, a plurality of bare wires 1*a* are twisted into the strand 10, and then a plurality of such strands 10 are twisted into the lower strand layer 11. Furthermore, a plurality of strands 10 of the same type are arranged around the outer circumference of the lower strand layer 11, and are twisted coaxially thereto, thereby forming the upper strand layer 12. During or after the formation of the wire conductor 1, a softening process using heating may be performed as appropriate. Examples of a timing at which the heating is performed can include a timing after the lower strand layer 11 is formed, and a timing after the upper strand layer 12 is formed.

(Structures of Insulated Wire and Wire Harness)

Figure 4:
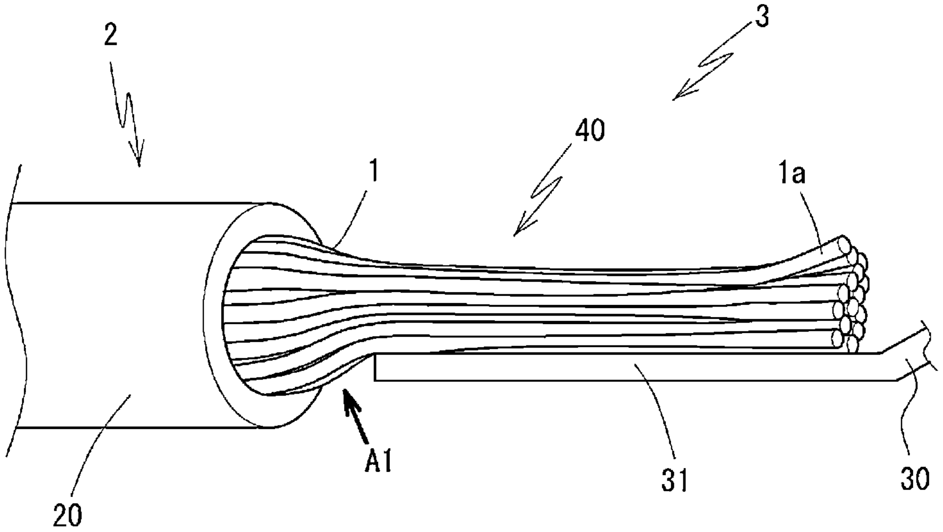
FIG. 4 is a side view schematically illustrating a state in which an insulated wire including the wire conductor shown in FIG. 1 is ultrasonically welded to a connection terminal.

FIG. 4 shows a wire harness 3 according to an embodiment of the present disclosure that includes an insulated wire 2 according to an embodiment of the present disclosure.

The insulated wire 2 includes the above-described wire conductor 1 according to the embodiment of the present disclosure, and an insulation coating 20 that coats the outer circumference of the wire conductor 1. Also, the wire harness 3 according to the embodiment of the present disclosure includes the insulated wire 2 and the connection terminal 30. At a terminal of the insulated wire 2, the insulation coating 20 is removed, and the wire conductor 1 exposed from the insulation coating 20 is ultrasonically welded to the connection terminal 30. The connection terminal 30 is made of, for example, copper or a copper alloy serving as a base material, and the wire conductor 1 is fixed to a wire fixation portion 31 in a flat plate shape by ultrasonic welding.

(Structure of Wire Conductor and Ultrasonic Welding)

In the above-described wire conductor 1 according to the embodiment of the present disclosure, the inter-layer gap proportion is kept low. With this, when the wire conductor 1 of the insulated wire 2 is ultrasonically welded to the wire fixation portion 31 of the connection terminal 30 in order to manufacture the wire harness 3, it is possible to suppress the occurrence of any welding defect.

Figure 5:
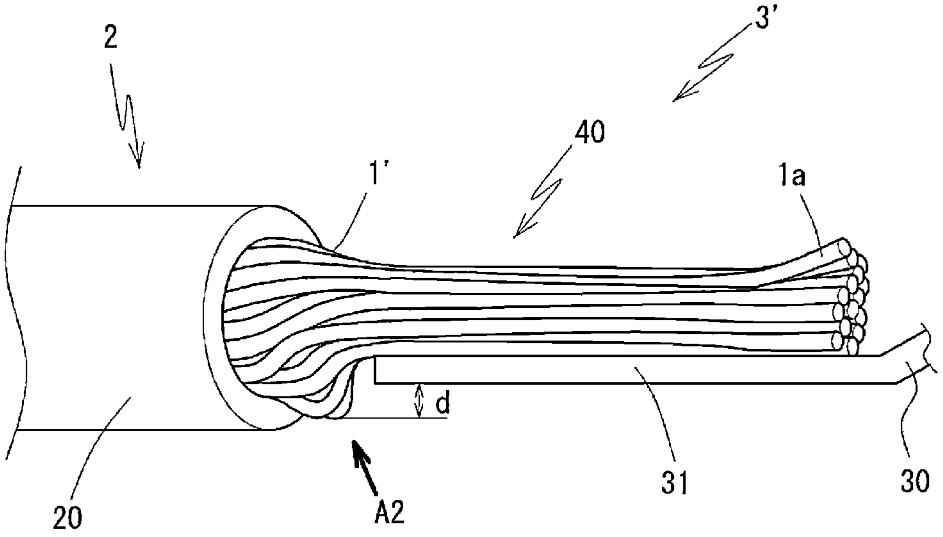
FIG. 5 is a side view schematically illustrating a state in which an insulated wire including the wire conductor shown in FIG. 2 is ultrasonically welded to the connection terminal.

When the wire conductor 1 is ultrasonically welded to the wire fixation portion 31 of the connection terminal 30, the wire conductor 1 exposed from the insulation coating 20 is inserted, together with the wire fixation portion 31 of the connection terminal 30, between a horn and an anvil of an ultrasonic welding machine. If, as the wire conductor 1' shown in FIG. 2, a large area of inter-layer gaps G1 is formed between the lower strand layer 11 and the upper strand layer 12, and the inter-layer gap proportion is large, the bare wires 1*a* are not likely to dissociate when the wire conductor 1' is inserted between an upper part and a lower part of the ultrasonic welding machine and ultrasonic welding is performed. The reason seems to be that when the wire conductor 1' is being inserted, strands 10 are likely to slide with respect to each other in the region between the lower strand layer 11 and the upper strand layer 12, and a force that is applied by the insertion results in the sliding of the strands and does not effectively act on the bare wires 1*a* becoming dissociated. If, during welding, a strand 10 is displaced before the bare wires 1*a* constituting the strand 10 dissociate, the strand 10 cannot be welded in a state in which the bare wires 1*a* are sufficiently dissociated. Because the bare wires 1*a* are not likely to dissociate, the bare wires 1*a* pressed by the horn before welding are deflected at a welded portion 40 as shown in a wire harness 3' in FIG. 5 and indicated by the arrow A2. The deflection of the bare wires 1*a* at the welded portion 40 will deteriorate the outer appearance of the wire harness 3'. Also, because the bare wires 1*a* are not likely to dissociate, ultrasonic energy is not efficiently transmitted to the welded portion 40, and the fixation force between the wire conductor 1' and the connection terminal 30 is also reduced.

In contrast, in the wire conductor 1 with small inter-layer gaps G1 as shown in FIG. 1, the gaps are not concentrated between the lower strand layer 11 and the upper strand layer 12, and thus strands 10, when inserted between the horn and the anvil of the ultrasonic welding machine, are not likely to slide with respect to each other between the lower strand layer 11 and the upper strand layer 12. Accordingly, in response to a force applied by the insertion, twisting of at least some of the strands 10 is solved, and the bare wires 1*a* constituting the strands 10 dissociate (disperse). Since the wire conductor 1 is welded in such a manner that the bare wires 1*a* are dissociated, the welded portion 40 is formed in which the bare wires 1*a* are put together closely and evenly. As a result of the dissociated bare wires 1*a* being put together closely, the ultrasonic energy is efficiently transmitted to the welded portion 40, and the bare wires 1*a* are firmly fixed to the wire fixation portion 31 of the connection terminal 30 in a state in which the bare wires 1*a* are put together and tensioned without being deflected.

As a result, as indicated by the arrow A1 in FIG. 4, an aesthetically pleasing welded portion 40 can be easily formed that is superior in outer appearance without any deflection of the bare wires 1*a* or with a very small deflection of the bare wires 1*a*. Also, a large fixation force is likely to be obtained at the welded portion 40. That is to say, this reduces the occurrence of any welding defect that involves deflection of the bare wires 1*a* or any reduction in fixation force. The length (distance d in FIG. 5) of the deflection of bare wires 1*a* measured from the lower end surface of the wire fixation portion 31 of the connection terminal 30 is preferably not greater than the thickness of the plate of the wire fixation portion 31, and is more preferably not greater than 60% of the thickness of the plate of the wire fixation portion 31. Alternatively, it is preferable that there is no deflection of the bare wire 1*a* that reaches a position below the lower end portion of the insulation coating 20 of the ultrasonically welded insulated wire 2.

Also, in view of not only the area of gaps between the lower strand layer 11 and the upper strand layer 12 but also the mode as to whether or not they are continuous, the gaps may be involved in suppression of welding defects. As described above, as shown in FIG. 1, it is preferable that there be no continuous gap between the lower twisted layer 11 and the upper twisted layer 12. With this, if the upper strand layer 12 deforms (if the relative positions of the bare wires 1*a* change) in response to welding, the bare wires 1*a* of the upper strand layer 12 and the bare wires 1*a* of the lower strand layer 11 easily come into contact with each other. With this, a force to be applied during welding is efficiently transmitted to the lower strand layer 11. Therefore, not only the upper strand layer 12 but also the lower strand layer 11 are likely to deform, and welding defects are unlikely to occur. That is to say, the reason seems to be that welding defects are not likely to occur since there is no continuous gap between the lower strand layer 11 and the upper strand layer 12. If, as shown in FIG. 2, there is a continuous gap between the lower strand layer 11 and the upper strand layer 12, the deformation of the upper strand layer 12 during welding is absorbed by this continuous gap, and thus the force is less likely to be transmitted to the lower strand layer 11. Therefore, the lower strand layer 11 does not sufficiently deform and welding defects are likely to occur.

As also described above, if the upper twist pitch is larger than the lower twist pitch, the inter-layer gap proportion will be reduced and the bare wires 1*a* will be more easily dissociated during the ultrasonic welding, resulting in particularly advantageous effects of suppressing the occurrence of any welding defect. Also, by increasing the strand twist pitch, the lower twist pitch, and the upper twist pitch, the effect of suppressing welding defects is enhanced due to the bare wires 1*a* being more easily dissociated.

WORKING EXAMPLES

The following will describe working examples. Note that the present invention is not limited to the working examples. Here, the correlation between the inter-layer gap proportion of the wire conductor and the occurrence of a welding defect was examined.

[Manufacturing of Samples]

(Manufacturing of Wire Conductor and Insulated Wire)

Thirteen bare wires with an outer diameter of 0.32 mm that are made of an aluminum alloy were twisted together into a strand. A lower strand layer was formed by disposing such six strands around the outer circumference of one strand, and bundling and twisting together the seven strands. Furthermore, an upper strand layer was formed by disposing twelve strands around the outer circumference of the lower strand layer, and twisting them coaxially with the lower strand layer.

Here, three types of samples 1 to 3 of wire conductors were formed. The twist pitches of the samples were set as given in Table 1 below.

TABLE 1

| | Sample 1 | Sample 2 | Sample 3 |
|---|---|---|---|
| Strand twist pitch (mm) | 36.5 | 32.7 | 36.9 |
| Lower twist pitch (mm) | 75.1 | 70.3 | 70.4 |
| Upper twist pitch (mm) | 89.8 | 86.3 | 85.9 |

Furthermore, insulated wires were manufactured by forming insulation coatings around the outer circumference of the wire conductors. Here, as the insulation coatings, cross-linked polyethylene were extruded with a thickness of 1.1 mm.

(Manufacturing of Wire Harness)

The insulation coatings were removed over a region of a length of 15.5 mm at terminal portions of the respective insulated wires manufactured in the above-described manner, and the wire conductors were exposed. At this time, the insulation coatings were maintained in a semi-stripped state. The exposed conductor portions of the insulated wires were respectively fixed to wire fixation portions of connection terminals using ultrasonic welding. The connection terminals are made of a copper alloy and the wire fixation portions thereof have a width of 10 mm, a length of 10.5 mm, and a thickness of 2.6 mm.

[Test Method]

(Evaluation of Inter-Layer Gap Proportion)

The insulated wires manufactured in the above-described manner were embedded into an acrylate resin, and were cut orthogonally to the axial direction, so that cross-sections of the samples were obtained. The cross-sections of the samples were shot using a digital camera and photos were acquired.

The inter-layer gap proportions in the photos acquired in the above-described manner were evaluated. First, as indicated by the guide lines in FIG. 3, a difference between the total area of gaps present inside the circle of the upper strand layer core diameter (R2) and the total area of gaps present inside the circle of the lower strand layer core diameter (R1) were estimated as the area (a) of inter-layer gaps. Furthermore, the area of gaps present inside the outer boundary of the entire conductor was estimated as the entire gap area (A). Then, the proportion of the inter-layer gap area (a) to the entire gap area (A) was regarded as an inter-layer gap proportion (a/A×100%). In addition thereto, the proportion of the entire gap area (A) to an area (AO) of the outer boundary of the entire conductor was evaluated as the gap ratio (A/A0×100%). Three individual pieces for each of samples 1 to 3 were evaluated, and averages of the three individual pieces were recorded.

(Determination of Welding Defects)

For the wire harnesses manufactured in the above-described manner, the states of the welded portions between the wire conductor and the wire fixation portion of the connection terminal were observed. The welded portion was determined as "having no welding defect" when the corresponding bare wires were not deflected or the extent (distance d in FIG. 5) of a bare wire deflection from the lower end surface of the wire fixation portion is within 1.5 mm. On the other hand, the welded portion was determined as "having a welding defect" when the dimension of a bare wire deflection exceeds 1.5 mm.

[Test Results]

Figure 6A:
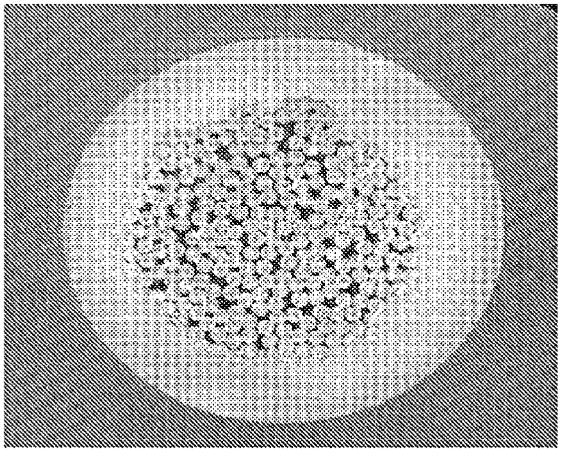
FIGS. 6A to 6C are photos of cross-sections of manufactured wire conductors, and correspond to samples 1 to 3 respectively.
Figure 6B:
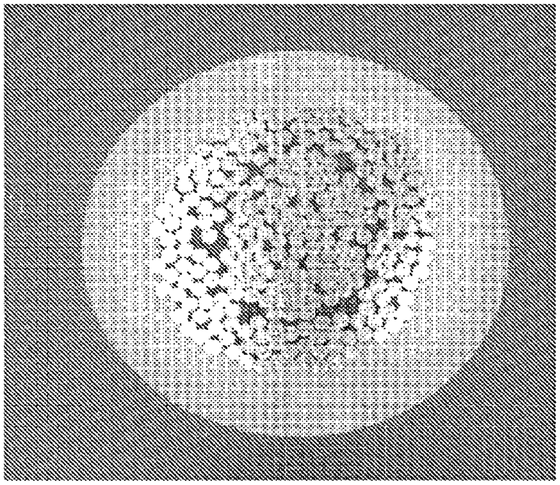
Figure 6C:
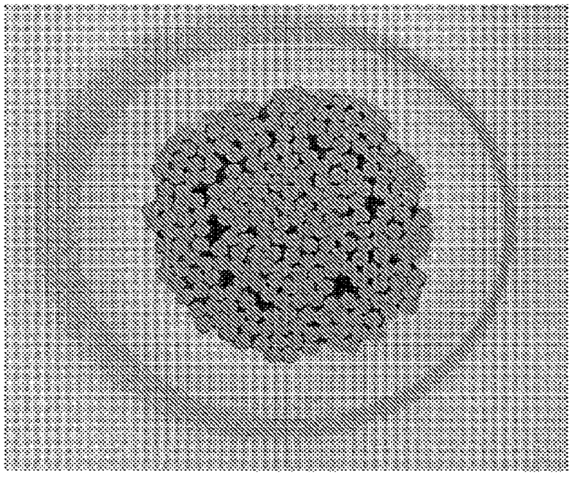

FIGS. 6A to 6C show photos of the cross-sections of the insulated wires of samples 1 to 3. Also, Table 2 below shows values of the inter-layer gap proportions and gap ratios of the entire wire conductors obtained in the above-described tests, and determination results as to whether or not there is any welding defect, with respect to samples 1 to 3. As to whether or not there is any welding defect, the same evaluation results were obtained for all of the three individual pieces evaluated for each of samples 1 to 3.

TABLE 2

| | Sample 1 | Sample 2 | Sample 3 |
|---|---|---|---|
| Inter-layer gap proportion (%) | 61.4 | 71.5 | 63.9 |
| Entire gap ratio (%) | 18.0 | 19.0 | 18.3 |
| Is there any welding defect? | No | Yes | Yes |

With reference to the photos in FIGS. 6A to 6C, it is clear that in samples 2 and 3, gaps formed between the upper strand layer located at the outer circumference of the entire wire conductor and the lower strand layer on the inner side thereof are more clearly recognizable than those at any other positions. These are inter-layer gaps. Particularly, in sample 2, the upper strand layer and the lower strand layer are clearly separate from each other, and clear inter-layer gaps are formed substantially in a ring shape between the layers. In contrast, in the sample 1, it is difficult to clearly recognize the boundary between the upper strand layer and the lower strand layer. This means that, between the upper strand layer and the lower strand layer, no gaps that are significantly larger than those at any other positions are formed as inter-layer gaps. Also, in the photos, focusing on the continuity of gaps between the upper strand layer and the lower strand layer, sample 1 has a lower continuity of gaps than samples 2 and 3, particularly, sample 2. That is to say, the dimensions of continuous gaps are small. In sample 1, no gap into which one bare wire can be directly accommodated is found between the upper strand layer and the lower strand layer.

The difference in dimension of the inter-layer gaps recognizable from the photos of the cross-sections is also clear from the evaluation results of the inter-layer gap proportions shown in Table 2. The inter-layer gap proportions of samples 2 and 3 have large values that exceed 63%. Particularly, the inter-layer gap proportion of sample 2 exceeds 70%. In contrast, the inter-layer gap proportion of sample 1 has a smaller value of 63% or less. Sample 1 has a smaller gap ratio of the entire wire conductor than in samples 2 and 3.

Then, referring to the determination results as to whether or not there are any welding defects in Table 2, only in sample 1 there was no welding defect, but there were welding defects in samples 2 and 3. These results can be attributed to the inter-layer gap proportions. That is to say, in sample 1 that had a small inter-layer gap proportion of 63% or less, no welding defects occurred, while in samples 2 and 3 that had an inter-layer gap proportion exceeding 63%, and welding defects occurred. It can be said that the lower the inter-layer gap proportion is, the less welding defects are likely to occur.

The embodiments of the present disclosure have been described in detail, but the present invention is not limited to the above-described embodiments, and various modifications are possible without departing from the spirit of the present invention.

LIST OF REFERENCE NUMERALS

1,1' Wire conductor
1*a* Bare wire
10 Strand
11 Lower strand layer
12 Upper strand layer
2 Insulated wire
20 Insulation coating
3, 3' Wire harness
30 Connection terminal
31 Wire fixation portion
40 Welded portion
A1 Structure without bare wire deflection in welded portion
A2 Structure with bare wire deflection in welded portion
d Dimension of bare wire deflection
G1 Inter-layer gap
R1 Circle with lower strand layer core diameter
R2 Circle with upper strand layer core diameter

What is claimed is:

1. A wire conductor comprising:
a lower strand layer in which a plurality of strands formed by twisting together a plurality of bare wires made of aluminum or an aluminum alloy are bundled and twisted together; and
an upper strand layer formed by twisting a plurality of strands around an outer circumference of the lower strand layer,
wherein in a cross section of the wire conductor that is orthogonal to its axial direction, a proportion of an area occupied by gaps formed between the lower strand layer and the upper strand layer to an area of gaps that are not occupied by the bare wires is 63% or less,
wherein a twist pitch of the strands of the lower strand layer is at least 200 times as large as an outer diameter of the bare wires, and
a twist pitch of the strands of the upper strand layer is at least 250 times as large as the outer diameter of the bare wires.

2. The wire conductor according to claim 1,
wherein the upper strand layer has a twist pitch that is greater than a twist pitch of the lower strand layer.

3. The wire conductor according to claim 1,
wherein in the cross section, the proportion of an area occupied by gaps formed between the lower strand layer and the upper strand layer is at least 15% and at most 25%.

4. The wire conductor according to claim 1,
wherein a twist pitch of the bare wires of the strands is at least 90 times as large as an outer diameter of the bare wires.

5. The wire conductor according to claim 1,
wherein a cross-sectional area of the entire wire conductor is at least 16 $mm^2$ and at most 50 $mm^2$.

6. An insulated wire comprising:
the wire conductor according to claim 5; and
an insulating coating that coats an outer circumference of the wire conductor.

7. A wire harness comprising:
the insulated wire according to claim 6; and
a connection terminal,
wherein, at a terminal of the insulated wire, the wire conductor exposed from the insulation coating is ultrasonically welded to the connection terminal.

* * * * *